United States Patent
Jagadeesan et al.

(10) Patent No.: US 7,599,688 B2
(45) Date of Patent: Oct. 6, 2009

(54) METHODS AND APPARATUS FOR PASSIVE MID-STREAM MONITORING OF REAL-TIME PROPERTIES

(75) Inventors: Lalita J. Jagadeesan, Naperville, IL (US); Ramesh Viswanathan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 679 days.

(21) Appl. No.: 11/288,953

(22) Filed: Nov. 29, 2005

(65) Prior Publication Data

US 2007/0124456 A1      May 31, 2007

(51) Int. Cl.
*H04Q 7/20* (2006.01)
(52) U.S. Cl. .................... 455/424; 379/15.01; 379/14
(58) Field of Classification Search .............. 455/424; 379/15.01, 10, 14
See application file for complete search history.

(56) References Cited

U.S. PATENT DOCUMENTS 5,293,323 A * 3/1994 Doskocil et al. ........... 702/185
5,740,233 A * 4/1998 Cave et al. ............. 379/112.06
5,790,633 A * 8/1998 Kinser et al. ............... 379/9.02
6,493,425 B1 * 12/2002 Abe ........................ 379/1.01

OTHER PUBLICATIONS

Netravali et al., "Correct Passive Testing Algorithms and Complete Fault Coverage", 23rd IFIP International Conference on Formal Techniques for Networked and Distributed Systems (FORTE), pp. 303-318 (2003).

* cited by examiner

Primary Examiner—Sanh D Phu (57) ABSTRACT

Methods and apparatus are provided for passive mid-stream monitoring of real-time properties. A passive mid-stream monitoring process is disclosed that determines whether a system is faulty. The passive mid-stream monitoring process obtains a real-time correctness property and a passively monitored mid-stream observation of the system. A timed correctness property, $A^\sigma$, is constructed from the passively monitored mid-stream observation. An intersection of the real-time correctness property and the timed correctness property is then determined to determine if the system is faulty. A passively testable determination process is also disclosed that determines whether a real-time correctness property for a system is passively testable. A determination is made as to whether (i) a set of all timed traces that are correct according to the real-time correctness property is timed prefix and timed suffix closed; and (ii) a system would satisfy the real-time correctness property if all timed-trace behaviors of the system would be included in the set.

23 Claims, 2 Drawing Sheets

FIG. 1

METHODS AND APPARATUS FOR PASSIVE MID-STREAM MONITORING OF REAL-TIME PROPERTIES

FIELD OF THE INVENTION

This invention relates generally to techniques for monitoring communication networks and other systems and, more particularly, to methods and apparatus for passive mid-stream monitoring of systems.

BACKGROUND OF THE INVENTION

As today's networks become increasingly complex and are comprised of equipment from multiple vendors, exhaustively testing all possible behaviors of the network becomes infeasible. The analysis of real-time behavior only increases this complexity. A number of techniques have been proposed or suggested for testing real-time behavior of complex systems.

Real-time model checking techniques, for example, assume that a specification of the system is given as a (concurrent set of) timed automata. Model checking tools then exhaustively analyze this specification against desired properties expressed in real-time variants of temporal logic. While model checking has been successful in identifying errors in critical portions of systems, it suffers from two challenges. First, model checking does not scale to large-scale systems because the size of the state space becomes intractable. In addition, model checking identifies errors in the specification of the system rather than in the actual system implementation. These challenges are further exacerbated for analysis of real-time systems.

In conformance testing techniques, the system implementation under test is given as a black box, in which the interface to the black box is known, inputs can be sent to the black box, and the outputs of the black box are observable. A modeling formalism is chosen such that the implementation can be assumed to be an (unknown) model in this formalism, and the specification of the system can be described as a model in this formalism. Conformance testing then generates a comprehensive suite of test cases to validate that the implementation satisfies the specification. In particular, the test cases correspond to sequences of inputs sent to the implementation, and the resulting outputs are compared to those expected by the specification as per a formally specified conformance relation. The test case generation can be done prior to testing (offline), or during testing (online/on-the-fly).

Passive monitoring techniques observe network equipment while it is running in the field. For certain applications, such as network management and intrusion detection for security, passive monitoring is, in fact, the only available methodology for validating the system's behavior. More generally, passive monitoring can be used to complement and augment functional testing and fault detection efforts that take place during the product/software development lifecycle.

A key challenge of passive monitoring is that observations of the system are necessarily obtained mid-stream, from an unknown state during the middle of the execution of the system. Generally, the mid-stream nature of passive testing places a limitation on the extent to which a property can be tested. For an arbitrary correctness property, while any rejected implementation is definitively faulty, all faulty implementations may not necessarily be detectable on the basis of their mid-stream observations. Passive monitoring techniques cannot make assumptions about the previous (unobserved) history of the system during its execution. Furthermore, passive monitoring techniques cannot influence the execution of the system by providing particular inputs to the system.

A need therefore exists for improved passive monitoring techniques that can observe the mid-stream behavior of systems during their execution in arbitrary environments. A further need exists for passive monitoring techniques that address those properties for which complete fault coverage can be achieved through passive testing.

SUMMARY OF THE INVENTION

Generally, methods and apparatus are provided for passive mid-stream monitoring of real-time properties. According to one aspect of the invention, a passive mid-stream monitoring process is disclosed that determines whether a system is faulty. The passive mid-stream monitoring process obtains a real-time correctness property and a passively monitored mid-stream observation of the system. The real-time correctness property can be expressed, for example, as a timed automaton. A timed correctness property, $A^o$, is constructed from the passively monitored mid-stream observation. The timed correctness property, $A^o$, includes substantially all possible behaviors of the system prior to the passively monitored mid-stream observation.

An intersection of the real-time correctness property and the timed correctness property is then determined. It is noted that the intersection of the real-time correctness property and the timed correctness property includes behavior that satisfies both correctness properties. If the intersection is an empty set, then there is no acceptable behavior before the mid-stream observation that ends with the mid-stream observation. If the intersection is not an empty set, then there is an acceptable behavior before the mid-stream observation that ends with the mid-stream observation.

According to another aspect of the invention, a passively testable determination process is disclosed that determines whether a real-time correctness property for a system is passively testable. The passively testable determination process determines whether a set of all timed traces that are correct according to the real-time correctness property is timed prefix and timed suffix closed. In addition, the passively testable determination process determines that a system would satisfy the real-time correctness property if all timed-trace behaviors of the system would be included in the set.

A more complete understanding of the present invention, as well as further features and advantages of the present invention, will be obtained by reference to the following detailed description and drawings.

DETAILED DESCRIPTION

The present invention provides an approach for passive monitoring of real-time properties, by observing the mid-stream behavior of systems during their execution in arbitrary environments. In particular, the present invention identifies a class of system models, referred to as expressively sufficient, with the implementation being tested assumed to be some instance of an expressively sufficient model. The conditions required of an expressively sufficient model are fairly simple and non-restrictive. Popular formalisms, such as timed automata and timed transition systems are expressively sufficient. For any correctness property P of an expressively sufficient model, a language (set) PT(P) is defined that consists of traces (including timing information) that can be exhibited by a correct implementation from some point mid-stream in its execution. Passively testing for a property P can then be formulated as the problem of determining membership of the mid-stream observation in the language PT(P). Passive testing algorithms are provided for two general classes of properties: (a) conformance to a specification model, and (b) trace-containment in a specification language of correct traces. These algorithms are PSPACE in the size of the specification model or an automaton used to specify the language of correct traces.

As indicated above, the mid-stream nature of passive testing places a limitation on the extent to which a property can be tested. For an arbitrary correctness property, while any rejected implementation is definitively faulty, all faulty implementations may not necessarily be detectable on the basis of their mid-stream observations. The present invention does not assume that all observations start from the initial state of the system, but rather that observations can be mid-stream. Second, the present invention does not assume that the testing infrastructure can control the inputs to the system, but rather that the operational environment controls all inputs to the system: in this aspect, it is passively monitoring the system as opposed to actively testing it.

The present invention supports the analysis of mid-stream observations, taken while the system is in the middle of its execution. In addition, the present invention addresses those properties for which complete fault coverage can be achieved through passive testing, and such a property is referred to as being passively testable. For passively testable properties, an implementation is correct if and only if it is never rejected on the basis of its passively monitored mid-stream observations. An exact characterization (necessary and sufficient conditions) is provided of passively testable properties. The characterization of passively testable real-time properties shows it would be sound to check them directly against passively monitored traces as if they were observed from the initial state, oblivious of their mid-stream nature. A class of real-time properties are identified for which the run-time verification tools and the timed observer infrastructure, all suitably extended to interval-timed traces, can be used for passive mid-stream monitoring as well.

This characterization enables the development of more efficient testing algorithms for passively testable properties. For example, when a specification machine is such that conformance to it is a passively testable property, the resulting passive testing algorithm is in NP when the specification machine is a timed automaton and polynomial time when the specification machine is an event-clock automaton. The characterization of passively testable properties therefore provides a systematic basis for identifying a sub-class that can be passively tested completely and efficiently.

Most previous work consider timed traces which are sequences of the form $\langle a_1, t_1 \rangle \ldots \langle a_n, t_n \rangle$ denoting the sequential occurrence of events $a_1, \ldots, a_n$ tagged with their respective occurrence times $t_1, \ldots, t_n$. The present invention employs an alternative notion of trace, referred to as interval-timed traces, that are sequences of the form $t_1 a_1 t_2 a_2 \ldots t_n a_n t_{n+1}$ denoting that after an elapse of time $t_1$, the first event $a_1$, occurs, followed by an elapse of time interval $t_2$ after which $a_2$ occurs and so forth until the last event $a_n$ after which a time interval $t_{n+1}$ elapses during which no other event occurs. Besides the fact that timing information is represented in the form of time-intervals between successive occurrences of events, the other significant aspect in which interval-timed traces differ from timed traces is the inclusion of the last interval $t_{n+1}$ which is not associated with the occurrence of any event. This permits a more direct and natural representation of the intuitions in the setting of passive testing. In particular, when monitoring a timed implementation from mid-stream in its execution, one cannot infer the absolute time occurrences of any observed events but one can observe the time intervals that are specified in an interval-timed trace. Furthermore, the time-interval observed to have elapsed after the occurrence of the last event during which no further events are observed is important to detecting violations of certain properties such as bounded liveness, e.g., that a response must occur within 5 seconds of a request.

For a more detailed discussion of prior work, as well as other issues discussed herein, see, L. Jagadeesan and R. Viswanathan, "Passive Mid-Stream Monitoring of Real-Time Properties," Proc. of the Fifth ACM Int'l Conf. on Embedded Software (EMSOFT), 343-52 (September, 2005), incorporated by reference herein.

Timed Automata

Timed Automata allow the behavior of systems that are governed by timing constraints to be formally specified.

According to one aspect of the invention, timed automata are used as a concrete example of a highly expressive formalism for modeling the system implementations (being passively tested) to which the present results are applicable. According to another aspect of the invention, the disclosed passive testing algorithms are based on existing solutions to decision problems on languages of traces (that include timing information) expressible by timed automata.

These two uses require slight differences in the details of the definition of timed automata. In specifying languages of traces, it is useful to include acceptance conditions that identify a subset of the generated traces as belonging to the language; these acceptance conditions do not however have any natural role when modeling system implementations. To distinguish between the two, the term timed state machines is used to refer to the formalism used for modeling system implementations and timed automata for expressing trace languages. A trace-semantics of timed transition systems is presented consisting of interval-timed traces, as opposed to classical timed traces. The move to interval-timed traces also allows a slight enrichment to be introduced in the definition of timed automata without increasing the algorithmic complexity of the decision problems of interest.

Timed State Machines are finite state machines augmented with a finite set of real-valued clock variables. The states in a timed state machine are called locations. Time can elapse in a location while transitions are instantaneous. Any of the clock variables can be reset to zero simultaneously with any transition. At any instant, the reading of a clock variable equals the time elapsed since the last time it was reset. Each transition includes a clock constraint that must be satisfied by the current values of the clock variables for the transition to be taken. Each location is associated with a clock constraint called its invariant; time can elapse in a location only as long as the values of the clock variables continue to satisfy its invariant. The clock constraints used in transitions and as invariants are as follows. Let X be a finite set of clocks. The set of clock constraints over X, denoted $\Phi(X)$, includes formulas defined by the grammar $\phi ::= x \sim c | \phi_1 \wedge \phi_2$ where $x \in X, c$ is a constant in Q, the set of non-negative rationals, and $\sim$ is in $\{\leq, \geq, <, >\}$. The precise definition of timed state machines now follows.

Definition 2.1 (Timed State Machines). A timed state machine M is a tuple $\langle L, L^o, \Sigma, X, \gamma, E \rangle$, where L is a finite set of locations, $L^o \subseteq L$ is the set of initial locations, $\Sigma$ is a finite set of labels, X is a finite set of clocks, $\gamma: L \to \Phi(X)$ is a mapping with $\gamma(l) \bullet$ giving the invariant associated with location l, and $E \subseteq L \cdot \Sigma \cdot 2^X \cdot \Phi(X) \cdot L$ is a set of edges. An edge $\langle s, a, \lambda, \phi, s' \rangle \in E$ represents an a-labeled transition from location s to location s', $\phi$ is a clock constraint that specifies when the transition is enabled, and $\lambda$ is the set of clocks that are reset to zero on this transition.

A clock valuation v over a set of clocks X is a mapping from X to Q. For $t \in Q$, the clock valuation $v + t$ is defined by $(v+t)(x) = v(x) + t$ for every $x \in X$. For $\lambda \subseteq X$, the clock valuation $v[\lambda := 0]$ is defined as mapping any $x \in \lambda$ to 0 and any $x \in /\lambda$ to $v(x)$. Definition 2.2 below defines the semantics of a timed state machine with alphabet $\Sigma$ as a subset of $(Q\Sigma)^*Q$, i.e., a set of sequences of the form $t_1 a_1 \ldots t_n a_n t_{n+1}$, where $n \geq 0$, $a_i \in \Sigma$ for $1 \leq i \leq n$ and $t_i \in Q$ for $1 \leq i \leq n+1$.

Definition 2.2 (Interval-Timed Trace Semantics). A run of a timed state machine $M = \langle L, L^o, \Sigma, X, \gamma, E \rangle$ is an edge-labelled finite sequence of the form $$\langle s_o, v_o \rangle \xrightarrow{t_1} \langle s_o, v'_o \rangle \xrightarrow{a_1} \langle s_1, v_1 \rangle \ldots \langle s_i, v_i \rangle \xrightarrow{t_{i+1}}$$
$$\langle s_i, v'_i \rangle \xrightarrow{a_{i+1}} \langle s_{i+1}, v_{i+1} \rangle \ldots \langle s_n, v_n \rangle \xrightarrow{t_{n+1}} \langle s_n, v'_n \rangle,$$

where $n \geq 0$ and $s_i \in L, v_i, v'_i$ are clock valuations over X for $0 \leq i \leq n$, $a_i \in \Sigma$ for $1 \leq i \leq n$, and $t_i \in Q$ for $1 \leq i \leq n+1$ such that $s_o \in L^o$ and $v_o(x) = 0$ for all $x \in X$ For all $t' \in Q$ such that $0 \leq t' \leq t_{i+1}, v_i + t'$ satisfies $\gamma(s_i)$ and $v'_i = v_i + t_{i+1}$, for $0 \leq i \leq n$ There is some transition $\langle s_i, a_{i+1}, \lambda, \phi, s_{i+1} \rangle \in E$ such that $v'_i$ satisfies $\phi$ and $v_{i+1} = v'_{i[\lambda := 0]}$, for $0 \leq i \leq n$ The trace of a run:

$$\langle s_o, v_o \rangle \xrightarrow{t_1} \langle s_o, v'_o \rangle \xrightarrow{a_1} \langle s_1, v_1 \rangle \ldots \langle s_i, v_i \rangle \xrightarrow{t_{i+1}}$$
$$\langle s_i, v'_i \rangle \xrightarrow{a_{i+1}} \langle s_{i+1}, v_{i+1} \rangle \ldots \langle s_n, v_n \rangle \xrightarrow{t_{n+1}} \langle s_n, v'_n \rangle,$$

is the sequence of its edge labels $t_1 a_1 \ldots t_n a_n t_{n+1} \ldots$. The trace semantics of the timed state machine, $\|M\|$ is defined to be the set of traces of all runs of the machine M.

A timed automaton is a timed state machine augmented with accepting locations and acceptance invariants associated with each accepting location. An accepting run is one in which the last location is an accepting location and any time elapsed in the last location meets its acceptance invariant. The set of traces of accepting runs is the language (of interval-timed traces) accepted by a timed automaton.

Definition 2.3 (Timed Automata). A timed automaton A is a tuple $\langle L, L^o, \Sigma, X, \gamma, E, L^F, \gamma^F \rangle$, where $L, L^o, \Sigma, X, \gamma, E$ are as in Definition 2.1. $L^F \subseteq L$ is a set of accepting locations, and $\gamma^F : L^F \to \Phi(X)$ gives the accepting invariant associated with each accepting location. An accepting run of A is a run $$\langle s_o, v_o \rangle \xrightarrow{t_1} \langle s_o, v'_o \rangle \xrightarrow{a_1} \langle s_1, v_1 \rangle \ldots$$
$$\langle s_i, v_i \rangle \xrightarrow{t_{i+1}} \langle s_i, v'_i \rangle \xrightarrow{a_{i+1}} \langle s_{i+1}, v_{i+1} \rangle \ldots \langle s_n, v_n \rangle \xrightarrow{t_{n+1}} \langle s_n, v'_n \rangle$$

of the timed state machine $(L, L^o, \Sigma, X, \gamma, E)$ such that $s_n \in L^F$ and $v_n'$ satisfies $\gamma^F(s_n)$. The language accepted by the timed automaton, $L(A)$ is the set of traces of all accepting runs of A.

Timed automata, as previously studied, do not include the accepting invariant $\gamma^F$ and their languages are defined to be sets of timed traces that are of the form $\langle a_1, t_1 \rangle, \ldots, \langle a_n, t_n \rangle$ where $n \geq 0$; for clarity of distinction, $L^T(A)$ is used to denote the language of timed traces of a timed automaton without the invariant $\gamma^F$. The decision problems of interest that have been previously studied are the membership problem of whether a timed trace a belongs to the timed language $L^T(A)$ of a timed automaton which is in NP, and the emptiness problem of whether the timed language $L^T(A)$ of a timed automaton is empty which is in PSPACE. It is shown that the corresponding decision problems for the interval-timed language given in Definition 2.3 fall into the same complexity classes.

A timed state machine can be viewed as a timed automaton in which all locations are accepting locations and accepting invariants are the same as location invariants. That is, for a timed state machine $M = \langle L, L^o, \Sigma, X, \gamma, E \rangle$, its corresponding timed automaton $A^m$ is defined to be $\langle L, L^o, \Sigma, X, \gamma, E, L, \gamma \rangle$ which has the property that $L(A^M) = \|M\|$. $A_1 \| A_2$ is used to denote the standard product construction on timed automata $A_1$ and $A_2$ (with acceptance invariants on the pairs of final locations being the conjunction of the acceptance invariant of each component location), noting that with respect to their interval-timed trace languages given by Definition 2.3, $L(A_1 \| A_2) = L(A_1) \cap L(A_2)$.

General Framework for Passive Testing

In this section, the passive testing problem is formally defined for real-time systems. While timed state machines serve as an exemplary model of the system implementations under test, the results are largely independent of the details of their definition. Therefore, rather than developing results specifically for timed state machines, a general axiomatization is developed of implementation models for which the results hold. This axiomatization can be seen as a distillation of the key characteristics of timed state machines that enable the results and allows them to be applicable to any other choice of real-time system model as long as it satisfies this axiomatization.

Recall that an interval-timed trace over a set $\Sigma$ is an element of $(Q\Sigma)^*Q$, i.e., a sequence of the form $t_1 a_1 \ldots t_n a_n t_{n+1}$ where $n \geq 0$, $a_i \in \Sigma$ for $1 < i < n$, and $t_i \in Q$ for $1 \leq i \leq n+1$. Interval-timed traces permit a natural definition of a timed concatenation operation that corresponds to the consecutive occurrence of two traces. For interval-timed traces $a \sigma = t_1 a_1 \ldots t_n a_n t_{n+1}$ and $\sigma' = t'_1 a'_1 \ldots t'_m a'_m t'_{m+1}$, the timed concatenation $\sigma \oplus \sigma'$ is defined to be the interval-timed trace $t_1 a_1, \ldots, t_n a_n (t_{n+1} + t'_1) a'_1 \ldots t'_m a'_m t'_{m+1}$. The trace 0 acts as the identity of timed concatenation with $\sigma \oplus 0 = 0 \oplus \sigma = \sigma$ for any trace $\sigma$. The notion of timed prefix is defined with respect to timed-concatenation, i.e., a trace $\sigma$ is a timed prefix of a trace $\sigma_1$ if there exists a trace $\sigma'$ such that $\sigma \oplus \sigma' = \sigma_1$. Note that timed prefixes are not the same as sequence prefixes, e.g., the traces 0.5 and $1_a 1$ are timed prefixes of the trace 1a2.5b3 neither of which are sequence prefixes.

The employed assumptions on the formal model representing system implementations being tested are captured in the following definition of expressively sufficient models.

Definition 2.4 (Implementation Model). A formalism for modeling implementations is expressively sufficient if functions $O(\bullet)$ and $[\bullet]$ can be defined on the class of all formal models with $O(I)$ a set, and $[I] \subseteq (QO(I))^*Q$, for any model I. Further, the following two axioms must be satisfied:

(Axiom I) For any $\sigma, \sigma' \epsilon (QO(I))^*Q$, if $\sigma \oplus \sigma' \epsilon [I]$ then $\sigma \epsilon [I]$ (Axiom II) For any set $\Sigma$ and trace $\sigma \epsilon (Q\Sigma)^*Q$ there is a model $I_\sigma$ with $O(I\sigma) = \Sigma$ such that $[I\sigma] = \{\sigma' \epsilon (Q\Sigma)^*Q \: \sigma' \oplus \sigma'' = \sigma$ for some $\sigma'' \epsilon (Q\Sigma)^*Q\}$.

Intuitively, for an implementation model I, the set $O(I)$ corresponds to the atomic observations or events that I can exhibit at any particular instant, such as a message being sent, or an input operation, or an output operation performed. These atomic observations are extended over time with timing information to yield interval-timed traces with $[I]$ giving the set of all traces that can be observed from I up to any time instant. (Axiom I) then captures the intuitive requirement that if an implementation can exhibit the observed sequence $\sigma \oplus \sigma'$, then it can also exhibit the timed prefix cy (namely, earlier in the same execution trace). (Axiom II) requires that the class of formal models be expressive enough so that for any interval-timed trace $\sigma$, there is an implementation $I_\sigma$ that exhibits exactly $\sigma$ and no other observations subsequently. (Axiom II) serves as an important technical requirement in the development of the results below.

As a canonical example, timed state machines satisfy the requirement of being expressively sufficient.

Example 2.5. For a timed state machine M given by $\langle L, L^\circ, \Sigma_n, X, \gamma, E \rangle O(M)$ is taken to be $\Sigma$ and $[M]$ as given by Definition 2.2 which can be seen to satisfy (Axiom I). For (Axiom II), consider any sequence or $\sigma = t_1 a_1 \ldots t_n a_n t_{n+1}$, where $n \geq 0$, $a_i \epsilon \Sigma$ for $1 \leq i \leq n$ for some set $\Sigma$, and $t_i \epsilon Q$ for $1 \leq i \leq n+1$. The implementation $I\sigma = \langle L, L^\circ, \Sigma, X, \gamma, E \rangle$, where $L = \{s_i | 0 \leq i \leq n\}$, $L^\circ = \{s_o\}$, $X = \{x\}$, $\gamma(s_i)$ is the constraint $x \leq t_{i+1}$ for $0 \leq i \leq n$, and $E = \{\langle s_i, a_{i+1}, \{x\}, x = t_{i+1}, s_{i+1}\rangle | 0 \leq i \leq n\}$.

It is then easy to establish by induction that $[I\sigma]$ satisfies the requirement of (Axiom II). Note that the machine $I\sigma$, is deterministic and therefore the smaller class of deterministic timed state machines are expressively sufficient, as well.

In the rest of this section, unless otherwise mentioned, models are considered with respect to any ambient modeling formalism that is expressively sufficient, and models are referred to in this ambient formalism as implementations.

For an (unknown) implementation under test, it must be determined through passive monitoring, whether the behavior satisfies some desired correctness property. For the purposes of the disclosed framework, it suffices to abstractly view any correctness property as a collection of implementations, namely those that satisfy the property.

DEFINITION 2.6. A property, P, is a collection of implementations. An implementation I satisfies a property P, denoted $I \models P$, if $I \in P$.

Consider the question of how to passively test a black-box implementation for some property P. In passive testing, access to the implementation itself is not available, nor can any knowledge of how long the implementation has already been running be assumed when observation begins. Instead, execution is monitored starting from some time instant after which events/actions in the execution and their occurrence instants can be observed. The information available to the monitor can therefore be naturally represented as a sequence of the form $t_1 a_1 \ldots t_n a_n t_{n+1}$ denoting an observation over a time-interval of length $t_1 + \ldots + t_{n+1}$, with $t_1$ marking the time-interval from the instant monitoring is begun to the occurrence of the first observed event $a_i$, $t_i$'s marking off the time-intervals between observation of the event $a_{i-1}$ and the event $a_i$ for $2 \leq i \leq n$, and $t_{n+1}$ marking the time-interval after the last event $a_n$ occurred. It is assumed that the monitor can measure time intervals only up to finite granularity or precision but not to arbitrary precision; to avoid assumptions on the precision of the digital clocks used by the monitor, which could be arbitrarily finite, the $t_1, \ldots t_{n+1}$ are taken to be rationals. The passively monitored observation are considered to be an interval-timed trace $\sigma$. Consider when the monitored implementation cannot be deemed faulty (i.e., violating the property P) on the basis of such an observed trace, $\sigma$. Since the observation was begun mid-stream, it must be assumed that some unknown trace $\sigma'$ preceded the observed sequence $\sigma$. Thus, the implementation cannot be deemed faulty if $\sigma' \oplus \sigma$ is a possible trace of a correct implementation, i.e., an implementation I satisfying P. Consider such traces $\sigma$ to be acceptable when passively testing the property P, and formally define PT(P) to be the set of all such acceptable traces.

DEFINITION 2.7. For a property P, the set PT(P) of interval-timed traces accepted by passive testing is defined as $\sigma \epsilon PT(P)$ if and only if there is some implementation $I \models P$ and trace $\sigma'$ with $\sigma' \oplus \sigma \epsilon [I]$ Conversely, if an interval-timed trace a $\sigma \epsilon /PT(P)$ is observed at any point midstream, then it can be concluded that the implementation under traces is definitely faulty; traces not in PT(P) can therefore be considered fault-symptomatic.

PROPOSITION 2.8 (Fault Symptomatic Traces). Let P be a property. For any implementation I, if $\sigma' \oplus \sigma \epsilon [I]$ with $\sigma \epsilon /PT$ (P) then $I \not\models P$.

A passive testing algorithm is therefore defined for some property P as determining membership of a given trace in PT(P).

Passive Testing Algorithms for General Timed Properties

A passive testing algorithm is presented for properties expressed in the form of requiring conformance to a specified timed state machine. In the untimed setting, conformance to a finite state machine was the first passive testing problem studied. The proposed passive testing algorithm was called the homing algorithm because it began by assuming that the implementation could be in any state and then progressively refined this knowledge by trying to infer or home in to the current state of the specification machine on the basis of the events observed.

In the timed setting, a similar presentation is more intricate because the state space consisting of locations and clock valuations is infinite. The algorithm is presented by a reduction to the emptiness problem for a suitably constructed timed automaton — the algorithm for checking emptiness then does the necessary "homing". Let $\prec$ be a conformance relation, with $I \prec M$ denoting that an implementation I is conformant to the timed state machine M. The property of implementations that are conformant (w.r.t. $\prec$) to a (fixed) specification timed state machine M, denoted $$P\frac{M}{\prec}$$

is then the set $\{I | I \prec M\}$. The following proposition characterizes the set of accepted passively monitored traces for the property $$P\frac{M}{\prec}$$

for any conformance relation $\prec$ that admits the specification M itself as a conformant implementation and that is no weaker than trace containment. Almost all typical conformance relations, such as being timed simulable, timed bisimilarity, trace containment, and trace equivalence clearly meet these requirements.

Proposition 2.9. If a conformance relation $\prec$ is such that M $\prec$ M and for any implementation I, I $\prec$ M $\supset$ [I] $\subseteq$ [M], then $$PT\left(P\frac{M}{\prec}\right) = \{\sigma \mid \exists \sigma' \cdot \sigma' \oplus \sigma \in [\![M]\!]\}$$

For an interval-timed trace $\sigma$ over an alphabet $\Sigma$, a timed automaton $A^\sigma$ is constructed that accepts exactly traces of the form $\sigma' \oplus \sigma$ for any $\sigma' \in (Q\Sigma)^*Q$. For $\sigma = t_1 a_1 \ldots t_n a_n t_{n+1}$ with $n \geq 0$, the automaton $A^\sigma$ is defined to be $(L, L^\circ, \Sigma, X, \gamma, E, L^F, \gamma^F)$ where $L = \{s_i | 0 \leq i \leq n\}$, $L^\circ = \{s_0\}$, $X = \{x\}$, $\gamma(s_i)$ is the vacuous constraint $x \geq 0$ for all $0 \leq i \leq n$, $E = \{\langle s_0, a, \{x\}, x \geq 0, s_0 \rangle | a \in \Sigma\} \cup \{\langle s_0, a_1, \{x\}, x \geq t_1, s_{i+1}\rangle\} \cup \{\langle s_i, a_{i+1}, \{x\}, x = t_{i+1}, s_{i+1}\rangle | 1 \leq i < n\}$, $L^F = \{s_n\}$ and $\gamma^F(s_n)$ is the constraint that $x = t_{n+1}$. The automaton $A^\sigma$ contains a single clock x that is reset to 0 with every transition. The transitions in $A^\sigma$ are of three kinds. The self-loops on the initial state $s_0$ for every $a \in \Sigma$ together with the clock constraint $(x \geq t_1)$ on the $a_1$-labelled transition from $s_0$ to $s_1$ ensure that all possible prefixes are time-concatenated with $t_1 a_1$ to reach $s_1$, and the transitions from $s_1$ onwards ensure that the only accepting trace from $s_1$ is $t_2 a_2 \ldots t_n a_n t_{n+1}$. It is noted that the use of the accepting invariant $\gamma^F$ in ensuring that the last time-interval elapsed is exactly $t_{n+1}$, which motivates the introduction of accepting invariants in timed-automata (Definition 2.3). It can therefore be established that the automaton $A^\sigma$ accepts all timed prefix extensions of $\sigma$.

Proposition 2.10. For any trace $\sigma \in (Q\Sigma)^*Q$, the timed automaton $A^\sigma$ has the property that $$L(A^\sigma) = \{\sigma' \oplus \sigma | \sigma' \in (Q\Sigma)^*Q\}.$$

Recalling from the above discussion of the properties of the timed automaton $A^M$ (for a timed state machine M) and product construction, it therefore follows from Proposition 2.10 that $L(A^\sigma || A^M) = \{\sigma' \oplus \sigma \in [M] | \sigma' \in (Q\Sigma)^*Q\}$. This combined with Proposition 2.9 therefore yields the following corollary.

Corollary 2.11. For any timed state machine M and any conformance relation $\prec$ satisfying the conditions of Proposition 2.9:

$$\sigma \in PT\left(P\frac{M}{\prec}\right) \text{ iff } L(A^\sigma || A^M) \neq \emptyset$$

Corollary 2.11 gives a passive testing algorithm for the conformance problem based on an algorithm for the language emptiness problem for timed automata. The size of $A^\sigma$ is linear in the size of $\Sigma$ and the length of a. The size of the product automaton is O(nm) where n is the maximum of length of a and cardinality of $\Sigma$ and m is the size of M. The emptiness problem for timed automata expressing interval-timed traces was established above to be in PSPACE and therefore this passive testing algorithm is PSPACE (in the size of $\sigma$ and M).

Figure 1:
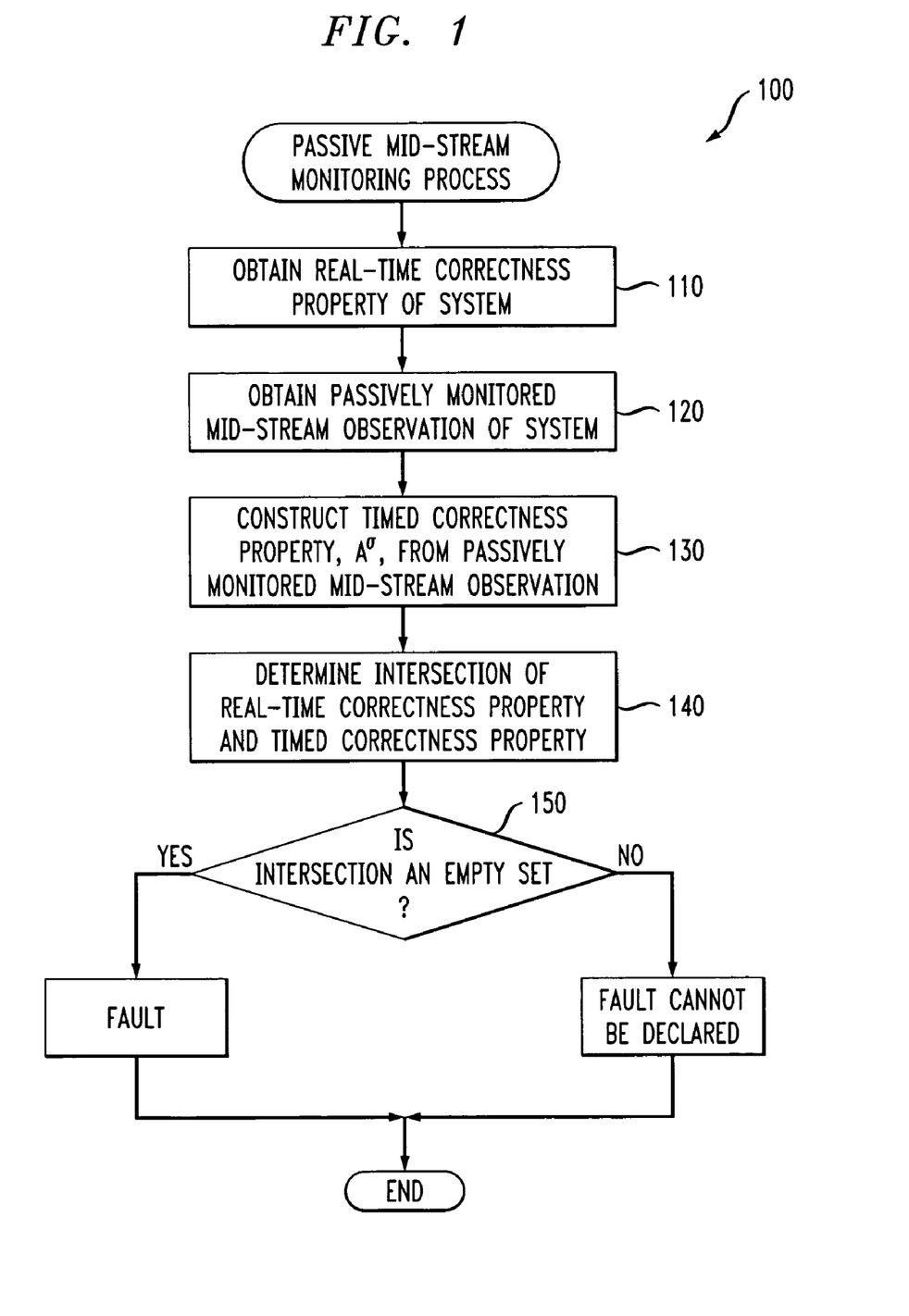
FIG. 1 is a flow chart describing an exemplary implementation of a passive mid-stream monitoring process, incorporating features of the present invention.

FIG. 1 is a flow chart describing an exemplary implementation of a passive mid-stream monitoring process 100, incorporating features of the present invention. Generally, the passive mid-stream monitoring process 100 determines whether a system is faulty. As shown in FIG. 1, the passive mid-stream monitoring process 100 initially obtains a real-time correctness property of the system during step 110. The real-time correctness property can be expressed, for example, as a timed automaton.

In addition, a passively monitored mid-stream observation of the system is obtained during step 120. A timed correctness property, $A^\sigma$, is constructed during step 130 from the passively monitored mid-stream observation. The timed correctness property, $A^\sigma$, includes substantially all possible behaviors of the system prior to the passively monitored mid-stream observation. An intersection of the real-time correctness property and the timed correctness property is determined during step 140. It is noted that the intersection of the real-time correctness property and the timed correctness property includes behavior that satisfies both correctness properties. In other words, the intersection of the real-time correctness property and the timed correctness property includes substantially all acceptable behavior according to the real-time correctness property that ends in the passively monitored mid-stream observation.

Finally, it is determined during step 150 whether the intersection is an empty set. If the intersection is an empty set, then there is no acceptable behavior before the mid-stream observation that ends with the mid-stream observation. If the intersection is not an empty set, then there is an acceptable behavior before the mid-stream observation that ends with the mid-stream observation.

Passively Testable Timed Properties

In passively testing an implementation for some property P, the correctness of the implementation (i.e., whether it satisfies P) is deemed on the basis of membership of its passively observed traces in PT(P). By Proposition 2.8, if the implementation is rejected, i.e., it exhibits a passively observed trace that is not in PT(P), then the implementation is definitely faulty. However, as the following example shows, the converse does not hold in general, i.e., an accepted implementation is not necessarily correct.

Example 2.12. Let $\Sigma$ be some alphabet, $\delta$ some constant in Q, and define the language L of interval-timed traces over $\Sigma$ as $L = [t_1 a_1 \ldots a_n t_{n+1} |_{t1} \leq \delta]$, and consider the property $P = \{I | [I] \supseteq L\}$. Intuitively, P is the property of implementations whose first action occurs within $\delta$ time units. It is shown that any interval-timed trace $\sigma \in PT(P)$. Let $\sigma'$ be the trace 0a0 for some $a \in \Sigma$. Then for the implementation $I = I_{\sigma' \oplus \sigma}$, given by Axiom (II) (of Definition 2.4), I|=P and $\sigma' \oplus \sigma \in [I]$. Therefore, by Definition 2.7, $\sigma \in PT(P)$. Let $\tau$ be some trace of the form $t_1 a_1 \ldots a_n t_{n+1}$ where $t_1 > \delta$ and consider the implementation $I_\tau$ given by Axiom (II) of Definition 2.4. Clearly, $\tau \in L$ and hence $I_\tau \neq P$. However, because $PT(P) = (Q\sigma)^*Q$, for any $\sigma'$, $\sigma$ with $\sigma' \oplus \sigma \in [I_\tau] \in PT(P)$. Thus, the implementation $I_\tau$ would never be rejected when being passively tested for property P even though $I_\tau \neq P$.

The class of properties are explored for which, in addition to guaranteeing the faultiness of rejected implementations, passive testing can be used to establish the correctness of accepted ones as well, i.e., if every passively monitored trace of an implementation is accepted then the implementation is assured to satisfy the property. Such properties are defined as being passively testable.

Definition 2.13 (Passive Testability). A property P is passively testable if and only if it has the following closure property: Suppose that I is an implementation such that for all traces $\sigma'$, $\sigma$ with $\sigma' \oplus \sigma \in [I]$, $\sigma \in PT(P)$. Then I|=P.

Definition 2.13 can be read, contrapositively, as stating that a passively testable property is one for which any faulty implementation I|$\neq$ P manifests a fault-symptomatic trace and would therefore be rejected through passive testing. Passively testable properties therefore admit a complete fault coverage through passive testing. Characterization of the class of properties that are passively testable are of interest. For a property P, define the language $L_P$ of interval-timed traces as $L_P = \cup_I I = P [I]$.

Lemma 2.14. Suppose that P is a passively testable property. Then $I \models P$ iff $[I] \subseteq L_P$.

Lemma 2.14 yields a necessary condition for a property to be passively testable, which can be restated in terms of the classical notion of safety. Define a language L of interval-timed traces to be timed prefix-closed if and only if for any $\sigma, \sigma'$, if $\sigma' \oplus \sigma \in L$ then $\sigma' \in L$. A property P is a timed safety property if there exists a timed prefix-closed language L such that $I \models P$ iff $\|I\| \subseteq L$. Using (Axiom I) of Definition 2.4, it is easy to see that the language $L_P$ is timed prefix-closed for any property P. The following corollary of Lemma 2.14 is obtained:

Corollary 2.15. Suppose that P is a passively testable property. Then P is a timed safety property.

Corollary 2.15 shows that the only passively testable properties are timed safety properties. However, not all timed safety properties are passively testable. The language L of Example 2.12 is timed prefix-closed and the property P considered in Example 2.12 is therefore a timed safety property that is not passively testable. Timed safety is therefore a necessary but not sufficient condition for passive testability. The set of necessary and sufficient conditions are now identified under which a property is passively testable. For a language L of interval-timed traces, L is timed suffix-closed if and only if for any $\sigma, \sigma'$, if $\sigma' \oplus \sigma \in L$ then $\sigma \in L$.

Theorem 2.16 below provides an exact characterization of passively testable properties. Theorem 2.16. A property P is passively testable if and only if the following two conditions hold:

1. $I \models P$ iff $\|I\| \subseteq L_P$
2. $L_P$ is timed suffix-closed.

Using Theorem 2.16, passively testable properties can be characterized as a natural special subclass of timed safety-properties.

Corollary 2.17. A property P is a passively testable property if and only if there is a timed prefix-closed and timed suffix-closed language L of interval-timed traces such that $I \models P$ iff $\|I\| \subseteq L$.

While passively testable properties are a subclass of timed safety-properties, it should be noted that in the setting of interval-timed traces these include properties such as bounded liveness. For example, the property that every a should be followed by a b within a time-interval $\delta$ can be expressed as the language $L = \{t_1 a_1 \ldots a_n t_{n+1} | \forall i, a_i + a \Rightarrow (\forall j \Rightarrow i. t_{i+1} + \ldots + t_j > \delta \Rightarrow \exists i < k \leq j. a_j = b)\}$ which can be seen to be timed prefix- and timed suffix-closed.

The characterization of passively testable properties given by Theorem 2.16 leads to the following characterization of PT(P) for passively testable properties P.

Theorem 2.18. Suppose that P is a passively testable property. Then $PT(P) = L_P$.

The significant import of Theorem 2.18 is that it yields more efficient passive testing algorithms for passively testable properties. For example, applying Theorems 2.16 and 2.18 to trace-containment, the following corollary is obtained.

Corollary 2.19. Consider any modeling formalism that is expressively sufficient and let M be a model in this formalism. Then the property $$P \overset{M}{\leq} = \{I \mid \|I\| \subseteq \|M\|\},$$

of being trace-contained in M is passively testable if and only if $\|M\|$ is timed suffix-closed. If $\|M\|$ is timed suffix-closed then $$PT\left(P \overset{M}{\leq}\right) = \|M\|.$$

If the specification machine M is a timed state machine, then Corollary 2.19 yields a passive testing algorithm that consists of checking for membership in $L(A^M)$ which can be done in NP, in contrast to the PSPACE algorithm presented above. If M is an event-clock automaton, the complexity reduces even more significantly to polynomial time. In general, the characterization of Theorem 2.18 allows checking the passively observed trace directly against the property // specification behaving as if the trace was observed from the beginning without having to account for its mid-stream nature.

Finally, an alternative characterization of passive testability is presented that is sometimes easier to establish for certain properties. This characterization is obtained by considering the complement of $L_p$, the set of violating traces. A property is passively testable if and only if the set of violating traces satisfies the closure condition that any trace containing a violating subtrace must itself also be a violating trace.

Corollary 2.20. A property P is passively testable iff the set $S = \overline{L_P}$ satisfies the following closure property: If $\sigma \in S$ then for any $\sigma', \sigma'' \sigma' \oplus \sigma \oplus'' \in S$.

In particular, Corollary 2.20 implies that if a faulty subtrace is observed then no (unobserved) past behavior could provide mitigating circumstances to make the complete trace correct. This provides an intuitive explanation of the key characteristic of passively testable properties that makes them completely testable even in the absence of information about the initial unseen segment of the trace.

Figure 2:
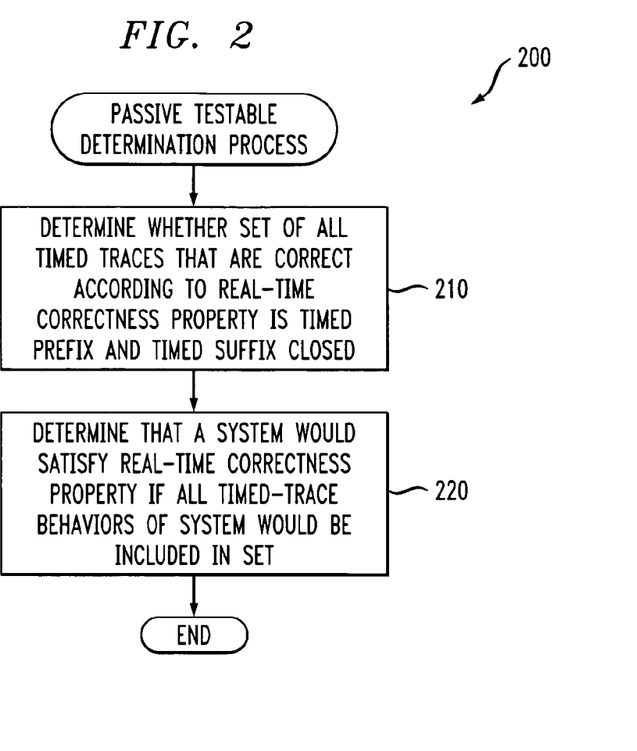
FIG. 2 is a flow chart describing an exemplary implementation of a passively testable determination process, incorporating features of the present invention.

FIG. 2 is a flow chart describing an exemplary implementation of a passively testable determination process 200, incorporating features of the present invention. Generally, the passively testable determination process 200 determines whether a real-time correctness property for a system is passively testable. Initially, the passively testable determination process 200 determines during step 210 whether a set of all timed traces that are correct according to the real-time correctness property is timed prefix and timed suffix closed. Thereafter, the passively testable determination process 200 determines during step 220 that a system would satisfy the real-time correctness property if all timed-trace behaviors of the system would be included in the set.

Telecommunications Application: The Heartbeat Monitor

The "Heart-Beat Monitor" (HBM), is a telephone switching application developed at Lucent Technologies. The HBM of a telephone switch determines the status of different elements connected to the switch by measuring propagation delays of messages transmitted via these elements. This information plays an important role in the routing of data in the switch, and can significantly impact switch performance.

In telephone switches, calls are typically routed through a network of hardware devices, involving a distributed set of processors. In order to ensure the reliability of calls, switches can determine the status of their processors by measuring propagation delays of messages transmitted between them. Longer than expected delays may indicate potential problems; the switch may then temporarily cease to connect new telephone calls over all hardware units connected to the offending processor. This can significantly impact switch performance if the switch normally relies on these units to carry a substantial proportion of telephone calls.

The "Heart-Beat Monitor" (HBM) of a Lucent switching system can be passively tested using the present invention against its intended real-time properties. The HBM software is responsible for measuring the propagation delays of messages between two processors A and B. The HBM, running on processor A, periodically sends a "heart-beat" message to processor B. Upon receipt of the heart-beat message, processor B responds by sending an acknowledgment back to processor A. The HBM monitors the delay between the transmission and acknowledgment of messages. If such delays become unacceptable, the HBM temporarily ceases the routing of all new telephone calls over processor B (i.e., a resource suspension).

The only constraints that can be assumed about processor B is that heart-beat messages sent by processor A will not be resent in a different order by processor B. However, there can be arbitrary delays in the re-sending of messages, and messages may be lost. Thus, every heart-beat message sent by processor A contains some information that uniquely identifies it, and the HBM software keeps track of the time that it was sent. When a message is received from processor B, the HBM software calculates the delay between the send-time and the receive-time of the message. Because of memory and performance limitations, the HBM software bounds the number of outstanding heart-beat messages (sent but not yet received) being tracked by keeping a small fixed-size array of messages sent to processor B. Each heart-beat message is uniquely identified by its array index and a timestamp corresponding to when it was sent; the receipt of the corresponding message is marked in the array index. The HBM cycles through this fixed-size array when sending heart-beat messages. Upon visiting a particular array index, if the HBM software finds that the corresponding message has not yet been received, it is considered to be lost.

In order to avoid high sensitivity to delays/loss of individual messages, the HBM software is structured in three sequential, mutually exclusive, stages. The first stage indicates that resource suspension has not been triggered in the recent past, the second stage serves to dampen the sensitivity of the HBM to individual delays for a period of time, and the third stage is intentionally sensitive to all delays. After spending a fixed period of time in the third stage, the software reenters the first stage. It is noted that resource suspension can be triggered only in the third stage. The algorithm used by the HBM software to determine whether resource suspension should be triggered is described in P. Godefroid et al., "Model Checking Without a Model: An Analysis of the Heart-Beat Monitor of a Telephone Switch Using Verisoft," ISSTA, 124-133 (1998).

The decision to trigger resource suspension involves some tradeoffs. Calls routed over processor B may not behave reliably in the face of unacceptable propagation delays; on the other hand, resource suspension may cause many new calls to be blocked. Clearly, end-users may become irate in either situation; furthermore, switch operators are required by law to report every extended occurrence of call blocking to the Federal Communications Commission. Hence, the HBM software is carefully engineered to achieve a reasonable balance between switch reliability and switch capacity.

In the past, the HBM software in this switch had come under scrutiny because of discoveries in the field that resource suspension was occurring too frequently and resulting in a significant decrease in network capacity. The development team had obtained mid-stream timed trace observations of the system running in the field, and had attempted to reverse-engineer the software to better understand the underlying executions of these timed traces. As a research development collaboration, a dynamic state-space exploration tool was employed, to analyze the behavior of the HBM software of this switch against its intended properties, and the analysis revealed flaws in the software that were subsequently corrected by the development team.

The analysis, however, suffered from three drawbacks: (a) it abstracted away from real-time (b) it only performed analysis from the initial state of the system, and did not support mid-stream analysis, and (c) it required a significant investment in implementing a separate environment for each of the properties, in order to perform dynamic analysis of the system. These drawbacks led to using the HBM of this switch as a case study for timed automata-based passive testing.

Timed Automata Based Passive Testing of HBM

In order to apply the timed automata-based testing framework described above to the exemplary HBM software, the intended real-time properties of the HBM are first specified as timed automata, and then the real-time model checker UPPAAL (G. Behrmann et al., "A Tutorial on UPPAAL," Volume 3185 of Lecture Notes in Computer Science, 200-236 (Springer, 2004; M. Bernardo and F. Corradini, editors) is used to perform passive mid-stream monitoring of the HBM software against these properties.

Intended Properties of the HBM Software

In order to describe the intended properties of the HBM software, the following definitions and notation are used. It is noted that $\lceil d_{stage2}/d_{period}\rceil<10$, $a_2<a_1<20$, and $b<10$. First, $d_{period}$ is defined as the fixed period between successive heart-beat messages sent by the HBM. Second, the propagation delay of a message that is sent but never received by the HBM is $\infty$. Otherwise, the propagation delay is $t_2-t_1$, where $t_1$ is the time the message was sent by the HBM, and $t_2$ is the time it was received by the HBM. Third, a message is considered to be on time if its propagation delay is less than or equal to $d_{ontime}$, where $d_{ontime}$ is a non-zero integer constant strictly less than $d_{period}$. A message is considered to be slightly late if its propagation delay is strictly between $d_{ontime}$ and $d_{period}$. A message is considered to be late/lost if its propagation delay is strictly greater than $d_{ontime}$.

The HBM software is intended to satisfy the following properties.

1. If no heart-beat messages return to processor A from the time that Stage 1 was last entered, then resource suspension is not triggered within $a_1 \times d_{period}$ time units since Stage 1 was last entered. Furthermore, resource suspension is triggered within $(a_1+2) \times d_{period}$ time units from the time that Stage 1 was last entered.

2. If B resends every message slightly late from the time that Stage 1 was last entered, then resource suspension is triggered within $(a_2+2) \times d_{period}$ time units from the time that Stage 1 was last entered.

3. Resource suspension is not triggered within $a_2 \times d_{period}$ time units since the last time Stage 1 was entered.

4. Resource suspension is not triggered before b messages have been late/lost since the last time Stage 1 was entered.

5. If messages strictly alternate between being slightly late and on time from the last time that Stage 1 was entered, resource suspension will never be triggered.

6. Stage 2 is never exited before $d_{stage2}$ time units from the time it is entered. Furthermore, it is exited within $d_{stage2}+(3\times d_{period})$ time units.

The real-time model checker UPPAAL can be used as an off-line engine for passive testing. UPPAAL supports the description of networks (i.e., parallel composition) of timed automata, and automatically performs verification of these timed automata specifications against properties specified in a real-time temporal logic.

UPPAAL was used to passively test that the interval-timed traces of the actual HBM code, observed mid-stream during the execution of the code, satisfy its desired properties. It is noted that the language of these properties are timed-prefix-closed, timed-suffix-closed sets of interval-timed traces, and hence the properties are passively testable. Thus, as described above, passive testing corresponds to checking of membership of the observed interval-timed traces of the HBM in the language of these properties.

The following steps are employed for passive mid-stream testing:

1. Described the negation of each of the above properties as timed automata in the UPPAAL specification language; in particular, the language of each timed automata is precisely the set of interval-timed traces (over the alphabet of stage changes in the HBM and the arrival of messages) that violates the corresponding property.

2. Instrument the HBM code to generate an event when the HBM code transitions between its sequential stages.

3. Implement a model of processor B in C that randomly either loses messages or sends messages back to the HBM on-time, slightly late, or with delays of random numbers of multiple intervals, while preserving the order of messages received from the HBM (as per the assumptions described above).

4. Run the HBM code and the environment code concurrently as Solaris processes. The execution generated traces (i.e., sequences) of events corresponding to the sending and receiving of messages by the HBM, together with stage changes in the HBM (as per step 2 above), as well as the real-time delay between successive events. Consistent with the motivation for passive testing, start observing each interval-timed trace from a random point mid-stream during its execution. Each mid-stream interval-timed trace was bounded by a specific, pre-determined length, or by the HBM reaching a state where resource suspension was triggered.

5. For each generated interval-timed trace, automatically check that the trace satisfies all the intended properties of the HBM described above. In particular, automatically construct a UPPAAL timed automaton whose language is exactly the singleton set consisting of the given interval-timed trace. Compose this timed automata in parallel with each of the specified timed automata from step 1 above. Thereafter, the model checking capabilities of UPPAAL are used to check reachability of an accepting state of this composed timed automata. The UPPAAL semantics of parallel composition ensure that this is equivalent to intersection of the languages of these timed automata, and hence to checking whether the given interval-timed trace is contained in the language of the intended properties.

System and Article of Manufacture Details

While FIGS. 1 and 2 show an example of a sequence of steps, it is also an embodiment of the present invention that the sequence may be varied. Various permutations of the algorithm are contemplated as alternate embodiments of the invention.

Figure 3:
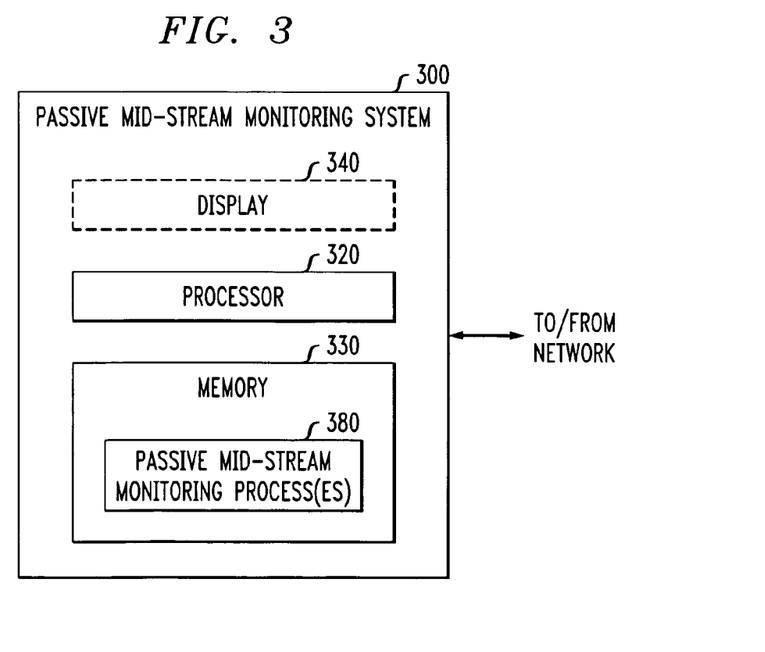
FIG. 3 is a block diagram of a passive mid-stream monitoring system 300 that can implement the processes of the present invention.

FIG. 3 is a block diagram of a passive mid-stream monitoring system 300 that can implement the processes of the present invention. As shown in FIG. 3, memory 330 configures the processor 320 to implement the methods, steps, and functions disclosed herein (collectively, shown as 380 in FIG. 3). The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into an application-specific or general-use integrated circuit.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, , memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for determining whether a system is faulty, comprising:

obtaining a real-time correctness property of said system;

obtaining a passively monitored mid-stream observation of said system;

constructing a timed correctness property from said passively monitored mid-stream observation that includes substantially all possible behaviors of said system prior to said passively monitored mid-stream observation;

determining an intersection of said real-time correctness property and said timed correctness property; and determining if an acceptable behavior exists based on whether said intersection is a non-empty set.

2. The method of claim 1, wherein said system is expressively sufficient.

3. The method of claim 1, wherein said real-time correctness property is expressed as a timed automaton.

4. The method of claim 1, wherein said passively monitored mid-stream observation is rejected if and only if there is no correct system model that could exhibit the observed passively monitored mid-stream observation.

5. The method of claim 1, wherein said intersection of said real-time correctness property and said timed correctness property includes behavior that satisfies both correctness properties.

6. The method of claim 1, wherein said intersection of said real-time correctness property and said timed correctness property includes substantially all acceptable behavior according to said real-time correctness property that ends in said passively monitored mid-stream observation.

7. The method of claim 1, wherein an empty set indicates that there is no acceptable behavior before said mid-stream observation that ends with said mid-stream observation.

8. The method of claim 1, wherein said non-empty set indicates that there is an acceptable behavior before said mid-stream observation that ends with said mid-stream observation.

9. The method of claim 8, wherein said non-empty set prevents said mid-stream observation from being classified as faulty.

10. A method for determining whether a real-time correctness property for a system is passively testable, comprising:

determining whether a set of all timed traces that are correct according to said real-time correctness property is timed prefix and timed suffix closed; and determining that a system would satisfy said real-time correctness property if all timed-trace behaviors of said system would be included in said set, wherein one or more of said steps are preformed by a processor.

11. The method of claim 10, wherein a real-time correctness property that is passively testable can achieve complete fault coverage using passive testing.

12. The method of claim 10, wherein a real-time correctness property that can achieve complete fault coverage using passive testing is passively testable.

13. The method of claim 11, wherein every system violating said correctness property can be determined to be faulty through analysis of mid-stream observations.

14. The method of claim 10, further comprising the step of determining if an observed behavior is in said set of all timed traces.

15. An apparatus for determining whether a system is faulty, the apparatus comprising:

a memory; and at least one processor, coupled to the memory, operative to:

obtain a real-time correctness property of said system;

obtain a passively monitored mid-stream observation of said system;

construct a timed correctness property from said passively monitored mid-stream observation that includes substantially all possible behaviors of said system prior to said passively monitored mid-stream observation;

determine an intersection of said real-time correctness property and said timed correctness property; and determine if an acceptable behavior exists based on whether said intersection is a non-empty set.

16. The apparatus of claim 15, wherein said real-time correctness property is expressed as a timed automaton.

17. The apparatus of claim 15, wherein said passively monitored mid-stream observation is rejected if and only if there is no correct system model that could exhibit the observed passively monitored mid-stream observation.

18. The apparatus of claim 15, wherein said intersection of said real-time correctness property and said timed correctness property includes behavior that satisfies both correctness properties.

19. The apparatus of claim 15, wherein said intersection of said real-time correctness property and said timed correctness property includes substantially all acceptable behavior according to said real-time correctness property that ends in said passively monitored mid-stream observation.

20. The apparatus of claim 15, wherein an empty set indicates that there is no acceptable behavior before said mid-stream observation that ends with said mid-stream observation and said non-empty set indicates that there is an acceptable behavior before said mid-stream observation that ends with said mid-stream observation.

21. An apparatus for determining whether a real-time correctness property for a system is passively testable, the apparatus comprising:

a memory; and at least one processor, coupled to the memory, operative to:

determine whether a set of all timed traces that are correct according to said real-time correctness property is timed prefix and timed suffix closed; and determine that a system would satisfy said real-time correctness property if all timed-trace behaviors of said system would be included in said set.

22. The apparatus of claim 21, wherein every system violating said correctness property can be determined to be faulty through analysis of mid-stream observations.

23. The method of claim 21, wherein said processor is further configured to determine if an observed behavior is in said set of all timed traces.

* * * * *

UNITED STATES PATENT AND TRADEMARK OFFICE
CERTIFICATE OF CORRECTION

PATENT NO. : 7,599,688 B2  Page 1 of 1
APPLICATION NO. : 11/288953
DATED : October 6, 2009
INVENTOR(S) : Jagadeesan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Twenty-eighth Day of September, 2010

David J. Kappos
*Director of the United States Patent and Trademark Office*